(12) United States Patent
Marin et al.

(10) Patent No.: US 12,333,449 B2
(45) Date of Patent: Jun. 17, 2025

(54) RECIPIENT NOTIFICATION RECOMMENDATION IN A DOCUMENT MANAGEMENT SYSTEM

(71) Applicant: DocuSign, Inc., San Francisco, CA (US)

(72) Inventors: Radu Marin, Seattle, WA (US); Alan Gene Roza, Seattle, WA (US); Justin Wade Hartin, Mountlake Terrace, WA (US)

(73) Assignee: Docusign, Inc., San Francisco, CA (US)

( * ) Notice: Subject to any disclaimer, the term of this patent is extended or adjusted under 35 U.S.C. 154(b) by 992 days.

(21) Appl. No.: 17/390,784

(22) Filed: Jul. 30, 2021

(65) Prior Publication Data
US 2023/0032995 A1 Feb. 2, 2023

(51) Int. Cl.
*G06N 5/04* (2023.01)
*G06F 16/93* (2019.01)
*G06N 20/00* (2019.01)

(52) U.S. Cl.
CPC .............. *G06N 5/04* (2013.01); *G06F 16/93* (2019.01); *G06N 20/00* (2019.01)

(58) Field of Classification Search
CPC ........... G06N 5/04; G06N 20/00; G06F 16/93
See application file for complete search history.

(56) References Cited

U.S. PATENT DOCUMENTS

| | | | | |
|---|---|---|---|---|
| 6,323,884 B1 * | 11/2001 | Bird | ..................... | G06F 3/04812 715/810 |
| 8,452,779 B1 * | 5/2013 | Kelley | .................. | G06F 16/953 707/736 |
| 12,051,255 B1 * | 7/2024 | Sharma | ................. | G06F 18/241 |
| 2002/0040431 A1 | 4/2002 | Kato et al. | | |

(Continued)

FOREIGN PATENT DOCUMENTS

WO WO-2020115606 A1 * 6/2020 ............. G06N 20/00

OTHER PUBLICATIONS

International Search Report and Written Opinion, Patent Cooperation Treaty Application No. PCT/US2022/038980, Dec. 15, 2022, 20 pages.

(Continued)

*Primary Examiner* — Shahid K Khan
(74) *Attorney, Agent, or Firm* — Shumaker & Sieffert, P.A.

(57) ABSTRACT

A system and a method are disclosed for generating recipient notification recommendations using a machine-learned model for a sending entity sending a set of documents to an acting entity and a subset of the set of documents to a receiving entity. The receiving user is subscribed to a notification service of a document management system to receive push notifications regarding statuses of inbound documents. The notifications for the receiving entity are generated based on recipient notification definition provided by the sending entity. The document management system trains a machine-learned model to generate recipient noti- (Continued)

fication recommendations for the sending entity selecting event criteria that indicate when to generate the notifications and types of data to include in the notifications. The machine-learned model is trained based on data associated with historical notification definitions provided by historical sending entities.

20 Claims, 7 Drawing Sheets

(56) References Cited

U.S. PATENT DOCUMENTS

| | | |
|---|---|---|
| 2006/0253418 A1* | 11/2006 | Charnock ............... G06F 16/34 |
| 2007/0192275 A1 | 8/2007 | Foygel et al. |
| 2007/0266095 A1* | 11/2007 | Billsus ................... G06Q 10/10 |
| | | 709/204 |
| 2008/0205610 A1* | 8/2008 | Bishop ................. H04L 51/224 |
| | | 379/93.24 |
| 2010/0088247 A1* | 4/2010 | Allin ...................... G06Q 50/08 |
| | | 705/344 |
| 2013/0159408 A1* | 6/2013 | Winn ..................... G06N 20/00 |
| | | 709/204 |
| 2015/0143219 A1 | 5/2015 | McCabe et al. |
| 2017/0147829 A1 | 5/2017 | Cismas et al. |
| 2019/0114569 A1* | 4/2019 | Palmer ............ G06Q 10/06316 |
| 2019/0281001 A1* | 9/2019 | Miller ..................... H04L 51/42 |
| 2021/0397784 A1 | 12/2021 | Grosse |
| 2022/0028248 A1* | 1/2022 | Kruse ................... G08B 21/04 |
| 2023/0032005 A1 | 2/2023 | Marin et al. |

OTHER PUBLICATIONS

United States Office Action, U.S. Appl. No. 17/390,556, filed Oct. 11, 2022, 39 pages.

* cited by examiner

Notification Definition Settings:

Trigger Events 410

Envelope Events
- ☑ Envelope Signed/Completed

Recipient Events
- ☑ Recipient Sent
- ☑ Recipient Delivery Failed
- ☑ Recipient Delivered
- ☑ Recipient Signed/Completed
- ☑ Recipient Declined
- ☑ Recipient Authentication Failure

Included Data Types 420

- ☑ Documents
- ☑ Attachments
- ☑ Folders
- ☑ Recipients
- ☑ Tabs
- ☑ Payment Tabs

[ Add ]  [ Cancel ]

Access a set of documents associated with a sending entity and an acting entity
610

Receive a recipient notification definition from the sending entity
620

Provide the set of documents to the acting entity
630

Detect one or more actions performed on the set of documents by the acting entity
640

Generate and send a notification comprising the identified types of data to a receiving entity
650

FIG. 6

RECIPIENT NOTIFICATION RECOMMENDATION IN A DOCUMENT MANAGEMENT SYSTEM

This disclosure relates generally to a document management system, and more specifically to generating notifications by the document management system for a receiving entity regarding documents routed to the receiving entity.

BACKGROUND

A document management system can enable sending entities to send documents to receiving entities. The sending entities may send the documents with tasks for the receiving entities to complete (e.g., signing a document, providing data to input fields embedded in a document) or send the documents such that the receiving entities may start internal processes involving the received documents. The document management system simplifies the process of distributing the documents and monitoring statuses of the documents for the sending entities by determining when events involving the documents occur and providing push notifications describing the events to the sending entities. In current systems, such push notifications are not sent to the receiving entities that are receiving the documents sent by the sending entities. A conventional method for the receiving entities to determine statuses of the inbound documents is to make API calls to the document management system and determine whether events involving the inbound documents have occurred based on information from the calls. However, receiving entities may receive a large volume of documents from various sending entities, and this method is not a reliable and scalable solution for the receiving entities to track inbound documents.

SUMMARY

A document management system described herein generates and sends a notification to a receiving entity according to a recipient notification definition set by a sending entity. In an embodiment, the document management system receives a request from a sending entity to send a set of documents to an acting entity for the acting entity to perform one or more tasks on the set of documents (e.g., review and sign the documents). When the document management system receives the request, the document management system also receives an identification of which subset of the documents to send to the receiving entity after the acting entity has completed the one or more tasks and a recipient notification definition that defines the conditions for generating notifications for the receiving entity. The recipient notification definition identifies the receiving entity to receive the selected subset of documents, event criteria associated with the subset of documents to trigger notifications, and types of data to be included in the notifications to provide to the receiving entity. After providing the set of documents to the acting entity, the document management system monitors actions of the acting entity and determines when actions performed on the set of documents by the acting entity satisfy the criteria identified in the recipient notification definition. When the criteria identified in the recipient notification definition are satisfied, the document management system generates and sends a notification including the types of data allowed by the recipient notification definition.

In an embodiment, the document management system generates notification recommendations for a sending entity to assist the sending entity in selecting a recipient notification definition for a subset of documents being sent to a receiving entity. The document management system may generate the notification recommendations based on a machine-learned model trained on historical recipient notification data from historical recipient notification definitions set by historical sending entities. The historical recipient notification data used as training data for the machine-learning model may include historical types of event criteria selected by historical sending entities that cause historical types of data selected by historical sending entities to be sent to historical receiving entities. To generate the notification recommendations for a subset of documents being sent to the receiving entity, the document management system may input characteristics of one or more of the sending entity, the acting entity, receiving entity, and the subset of documents to the machine-learned model and receive recipient notification recommendations to present to the sending entity as output. The document management system may present the recipient notification recommendations to the sending entity. When the sending entity selects one or more of the recipient notification recommendations, the document management system generates and transmits notifications to the receiving entity when the acting entity satisfies event criteria of the selected one or more recipient notification recommendations.

BRIEF DESCRIPTION OF THE DRAWINGS

FIG. 4 illustrates an example graphical user interface (GUI) of a document management system for providing a notification definition, in accordance with an embodiment.

FIG. 6 is a flowchart illustrating a process for providing a notification, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
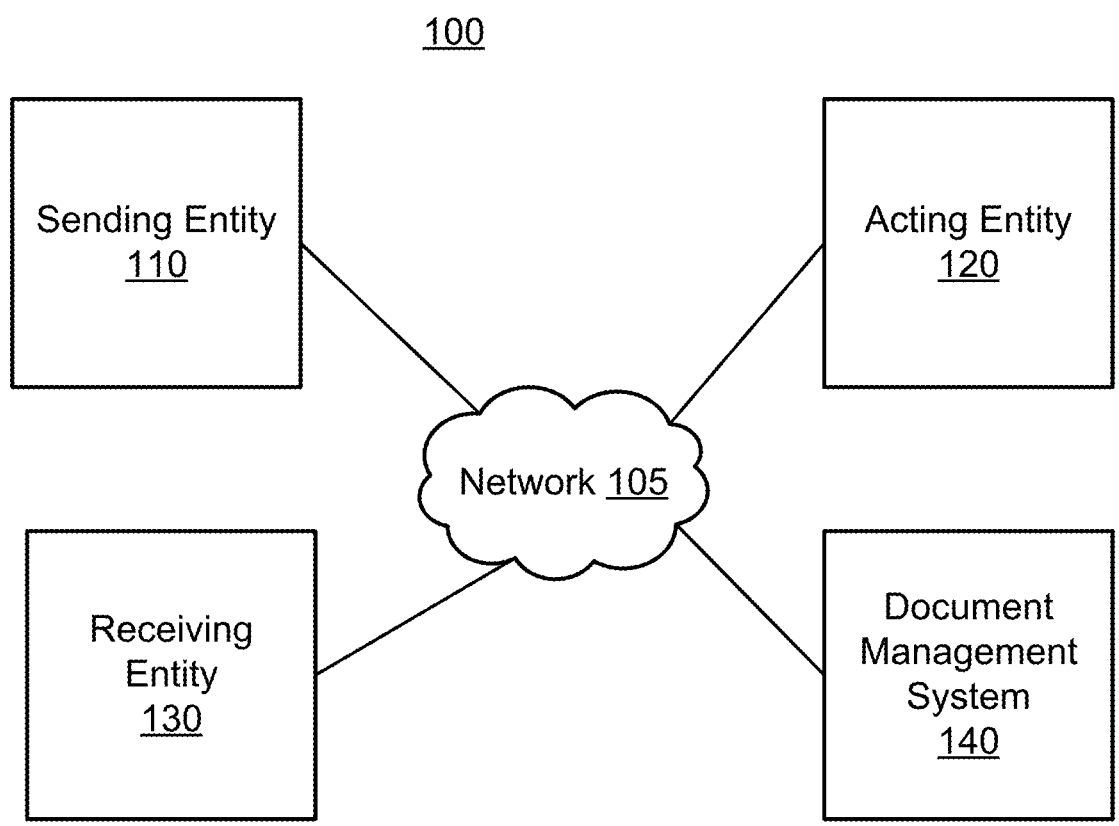
FIG. 1 is a block diagram of a system environment in which a document management system operates, in accordance with an embodiment.

FIG. 1 is a block diagram of a system environment 100 in which the document management system 140 operates. The system environment 100 shown by FIG. 1 includes the document management system 140, a sending entity 110, an acting entity 120, and a receiving entity 130. The system environment 100 may have alternative configurations than shown in FIG. 1, including for example different, fewer, or additional components. For example, an additional sending entity 110, acting entity 120, or receiving entity 130 may be communicatively coupled with the network 105 to the document management system 140. As another example, the document management system 140 may be communicatively coupled with a remote database storing data for the entities serviced (e.g., storing documents or entity profile information). As referred to herein, a "document" is an electronic document such as an invoice, contract, sales order, or agreement sent through a communications network (e.g., the network 105).

The system environment 100 described herein can be implemented within the document management system 140, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, document creation and management systems, collaborative document and workspace systems, online workflow management systems, multi-party communication and interaction platforms, social networking systems, marketplace and financial transaction management systems, or any suitable digital transaction management platform.

The network 105 may serve to communicatively couple the sending entity 110, the acting entity 120, the receiving entity 130, and the document management system 140. In some embodiments, the network 105 includes any combination of local area and/or wide area networks, using wired and/or wireless communication systems. The network 105 may use standard communications technologies and/or protocols. For example, the network 105 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 105 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 105 may be encrypted using any suitable technique or techniques.

The sending entity 110 is an entity using the document management system 140 to communicate documents to or coordinate document activity with other entities (e.g., acting entity 120, receiving entity 130). The sending entity 110 may be an individual, an organization, a company, an account, an administrator, and the like. The sending entity 110 may be the creator of the documents and/or who has authority to administer the documents by changing contents of the documents, grant or deny rights to access the document, place restrictions on, select tasks to be performed for the acting entity 120 or receiving entity 130 to complete, or send the documents to another entity.

The sending entity 110 sends a set of documents to the acting entity 120 by making a request to the document management system 140. The acting entity 120 may be an individual, an organization, a company, an account, an administrator, or another type of entity selected by the sending entity 110 to receive the set of documents and complete one or more tasks by performing actions on the set of documents such as opening the set of documents, reviewing contents of the set of documents, editing the contents of one or more documents, signing one or more documents, forwarding one or more documents to another user, performing identity verification, providing attachments, completing input fields of one or more documents, provide payments, or other interactions with one or more documents. The tasks may be specified by the sending entity 110 by configuring fields to be completed by the acting entity 120 within the set of documents. For example, the sending entity 110 may add signature blocks, input fields for textual input, and input fields for receiving attachments (e.g., images, spreadsheets, documents) in a document to be filled in by the acting entity 120.

The sending entity 110 may receive push notifications from the document management system 140 regarding the statuses of the set of documents as the acting entity 120 performs actions on the set of documents or regarding events that prevent the acting entity 120 from completing the assigned tasks. The sending entity 110 may be associated with a webhook listener that listens for incoming notifications sent by the document management system 140. For example, the notifications may indicate whether the set of documents has been sent to the acting entity 120, whether the set of documents has been delivered to the acting entity 120, whether the set of documents has been signed or completed, whether the acting entity 120 has declined the set of documents, whether the acting entity 120 has failed to authenticate, or other relevant events regarding the set of documents sent out by the sending entity 110.

The sending entity 110 may also send a request to the document management system 140 to send a subset of the documents to the receiving entity 130 after the acting entity 120 has completed the tasks. Like the sending entity 110 and the acting entity 120, the receiving entity 130 may be an individual, an organization, a company, an account, an administrator, or the like. The receiving entity 130 may be assigned to one or more tasks (e.g., review and sign documents) associated with the subset of documents by the sending entity 110 or may be a "cc recipient" that receives a copy of the subset of documents but does not have any tasks to perform. As used herein, the term "receiving entity" refers to an entity that receives one or more documents from the sending entity 110 through the document system 140 and subscribed to receive push notifications associated with the one or more documents from the document management system 140. The receiving entity 130 may be associated with a webhook listener that listens for incoming notifications sent by the document management system 140. In contrast, the acting entity 120 may receive one or more documents but not push notifications from the document management system 140.

In some embodiments, the receiving entity 130 may receive a large volume of documents from different sending entities 110 through the document management system 140. A common method for the receiving entity 130 to monitor inbound documents from the document management system 140 is to make API calls to the document management system 140 and detect changes in the status of the inbound documents. However, for a large volume of documents, this is not a scalable method for keeping track of the documents. Instead, the receiving entity 130 may subscribe to a webhook service provided by the document management system 140, and the document management system 140 may generate and transmit push notifications regarding the receiving entity's 130 inbound documents to the receiving entity's webhook listener. Based on the received notifications, the receiving entity 130 may kick off processes for the inbound documents (e.g., archive, quality control check, place order), which improves efficiency of workflows.

As described above, the sending entity 110 may send a set of documents to the acting entity 120 and send a subset of the documents to the receiving entity 130. That is, the receiving entity 130 may not have access to one or more documents in the set of documents that were sent to the acting entity 120. To prevent the receiving entity 130 from receiving data associated with the one or more documents that the receiving entity 130 does not have access to, the sending entity 110 may also provide a recipient notification definition to define conditions for generating notification definition for the receiving entity 130. The recipient notification definition may identify the receiving entity 130 to receive the subset of the set of documents in the request, one or more event criteria associated with the subset of documents to trigger a notification for the receiving entity 130, and types of data associated with the subset of documents to provide to the receiving entity 130 in the notification. The recipient notification definition allows the sending entity 110 to not only control the subset of documents that are send to the receiving entity 130 but also notifications sent by the document management system 140 regarding the subset of documents to improve data security.

As referred to herein, communication with an entity (e.g., sending entity 110, acting entity 120, receiving entity 130) involves communication with a computing device of the entity, where the computing device is capable of receiving user input as well as transmitting and/or receiving data via the network 105. In some embodiments, the computing device of an entity (e.g., sending entity 110, acting entity 120, receiving entity 130) is a conventional computer system, such as a desktop or a laptop computer. Alternatively, the computing device may be a device having computer functionality, such as a personal digital assistant (PDA), a mobile telephone, a smartphone, or another suitable device. The computing device is configured to communicate with the document management system 140 via the network 105, for example using a native application executed by the computing device and provides functionality of the document management system 140, or through an application programming interface (API) running on a native operating system of the computing device, such as IOS® or ANDROID™.

In one embodiment, the sending entity 110 is an insurance agent, the acting entity 120 is a policy holder, and the receiving entity 130 is an insurance company. The insurance agent may send a request to the policy holder including a set of documents regarding an accident claim with one or more tabs for policy holder to review and sign. After the policy holder has reviewed and signed the set of documents, a subset of the documents may be sent to the insurance company for further action by the insurance company or for records management. The insurance company may be connected to a large network of insurance agent and expect a large volume of inbound documents, so the insurance company may be subscribed to receive notifications from the document management system 140 for events associated with its inbound documents. However, the insurance agent may not grant the insurance company access to one or more of the documents that were sent to the policy holder, so the insurance company should not receive notifications including data from these documents. To limit when the insurance company is sent notifications and the types of data to be included in the notifications, the insurance agent may include a recipient notification definition with the request to send the set of documents to the policy holder. Details on generating and sending recipient notification are provided in the description of FIGS. 2-4.

In one embodiment, the document management system 140 generates recipient notification recommendations to the sending entity 110 based on historical notification definitions provided by historical sending entities. The document management system 140 may train a machine-learned model to determine recipient notification definition that a sending entity is likely to select based on characteristics of one or more of the sending entity 110, the acting entity 120, the receiving entity 130, and documents being sent to the receiving entity 130. The training and application of the machine-learned model for generating the recipient notification recommendation is described further in the description of FIGS. 2 and 5.

Document Management System

Figure 2:
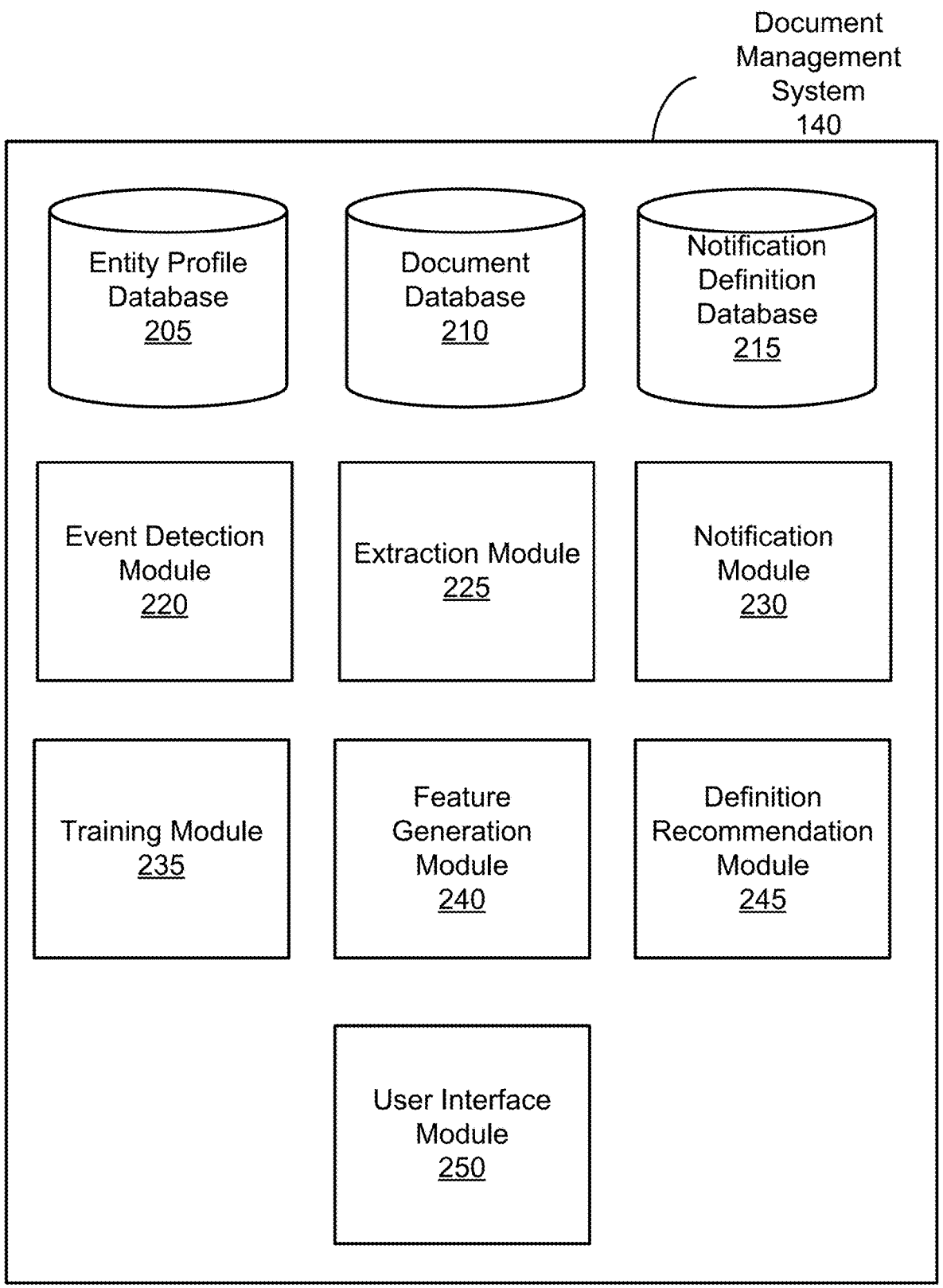
FIG. 2 is a block diagram of the document management system, in accordance with an embodiment.

FIG. 2 is a block diagram of the document management system 140, in accordance with an embodiment. The document management system 140 includes an entity profile database 205, a document database 210, a notification definition database 215, an event detection module 220, an extraction module 225, a notification module 230, training module 235, a feature generation module 240, a definition recommendation module 245, and a user interface module 250. The modules and databases illustrated in FIG. 2 are merely exemplary, and other embodiments of the document management system 140 may include additional, fewer, and/or different components. For example, at least one of the entity profile database 205, a document database 210, and the notification definition database 215 may be stored remotely and may be accessible through the network 105.

The entity profile database 205 stores entity characteristic information of entities (e.g., sending entity 110, acting entity 120, receiving entity 130) connected to the document management system 140 and activity history of the entities. As referred to herein, "characteristic information" of an entity represents characteristics of the entity that is not directly related to the document management system 140, and "activity history" of the entity represents activities performed by the entity within the document management system 140. Characteristic information of an entity may include type of industry associated with the entity (e.g., financial, technology, healthcare), number and identity of accounts associated with the entity (e.g., accounts of employees of the entity with accounts), type and number of entities with which the entity has interacted in the past, types of documents that the entity has sent or received in the past, applications used by the entity to access documents, geographic location of the entity, security measures associated with the entity, internet protocol (IP) addresses used by computing devices of the entity, hardware attributes of computing devices of the entity, or any other suitable characteristics of an entity that is not directly related to the document management system 140. Activity history may include data associated with activities previously performed by the entity such as type of action performed, date and time at which actions were performed, identities of documents on which the actions were performed, or other suitable data regarding previous activity performed by the entity.

The document database 210 stores documents that are sent or received by entities connected to the document management system 140. A document may include text data, image data, spreadsheet data, or any other type of data. In some embodiments, the document database 210 may store a plurality of documents sent in the same request as a set (also referred to herein as "an envelope"). An envelope may include information about the security and/or authentication requirements, signing requirements, collection requirements, network(s) through which the envelope is being sent, and the like. The requirements may be associated with the envelope generally, or may be specific to particular documents within the envelope. For example, each document in the envelope may have unique signing requirements based on the content of the document, and the envelope may be associated with a set of collection requirements based on the aggregate collection requirements of each document within the envelope. That is, one group of acting entities 120 and/or receiving entities 130 may be required to sign a first document, and a different group of acting entities 120 and/or receiving entities may be required to sign a second document different from the first document. A document may be modified by the sending entity 110 to include fields to be completed by the acting entity 120 and/or the receiving entity 130. Each envelope may also include one or more tags that identify which acting entities 120 and/or receiving entities 130 are responsible for execution of each document.

The document database 210 may also store metadata associated with a document such as document type, content of the document (e.g., certain keywords within the document), types of tasks associated with the document, creator of the document, access privileges, date of creation, file size, date of transmission, date of request completion, place of creation, template associated with document, tags and categories, file name, and any other aspect of the document.

The notification definition database 215 stores notification definitions provided by the sending entities 110. The notification definitions may be stored in association with requests generated by the sending entities 110 and used by the document management system 140 to determine when to generate notifications, which receiving entities 130 to transmit the notifications to, and types of data to include in the notifications. For example, a recipient notification definition for a request including a set of documents includes an identification of the receiving entity 130 to receive a subset of documents from the set of documents, an identification of one or more event criteria associated with the subset of documents, and an identification of types of data associated with the one or more documents to provide to the receiving entity 130 in the notification. The one or more event criteria represent events that trigger generating notifications.

Events may include "envelope events" that represent statuses of one or more documents in the subset of documents (e.g., completion of signing requirements or other types of requirements). Events may also include "recipient events" that represent events involving the receiving entity 130 such as when a subset of documents is sent to the receiving entity 130, when delivery to the receiving entity 130 has failed, when a subset of documents is successfully delivered to the receiving entity 130, when the receiving entity 130 has completed one or more tasks, when the receiving entity 130 has declined to perform one or more actions, when the receiving entity 130 fails an authentication check, or other such relevant events.

In some embodiments, after the acting entity 120 has completed requirements for a request including a set of documents, different subsets of the documents are selected by the sending entity 110 to be sent to a plurality of different receiving entities 130. When the sending entity 110 sends the request to the acting entity 120, the sending entity 110 may identify which documents to send and provide a notification definitions for each of the receiving entities 130 to the document management system 140 to indicate the different rules for generate notifications for the plurality of receiving entities 130. For example, a real estate agent (e.g., sending entity 110) may send a set of documents such as offers and contracts to a home buyer (e.g., acting entity 120) through the document management system 140 with a request for the home buyer to review and sign the documents. The real estate agent may instruct the document management system 140 to send a first subset of the signed documents to an escrow company (e.g., a first receiving entity 130) and a second subset of the signed documents to an inspector (e.g., a second receiving entity 130). Because the escrow company and the inspect play different roles and have different access privileges, the notifications that are generated for the escrow company are different from those generated for the inspector. The notification definitions enable the real estate agent to control when notifications are generated and what type of data to include in the notifications for each receiving entity 130.

In some embodiments, the notification definition database 215 may store notification preferences of the receiving entity 130. In some embodiments, the receiving entity 130 may wish to receive fewer notifications or less data than what the receiving entity 130 is permitted to receive. For example, the receiving entity 130 may configure notification preferences within the document management system 140 to select event criteria that should not trigger a notification, types of data not to be included in notifications, format of the notifications, whether to include documents in the notifications, or other settings. The notification preferences may be applied globally for all inbound documents or may be applied to specific documents based on the associated sending entity 110 or the acting entity 120. In some embodiments, the notification definition database 215 may also store notification preferences of the sending entity 110. The sending entity 110 also receive push notifications from the document management system 140 and may select when to be notified of events regarding documents sent out by the sending entity 110. Because the sending entity 110 is the owner of the documents, the sending entity 110 may receive notifications for all events involving the documents by default, but the sending entity 110 may configure the settings to customize which notifications to receive.

The event detection module 220 monitors activities of entities within the document management system 140 and detects when the activities satisfy event criteria defined in the notification definitions that trigger notifications. In some embodiments, the activities may involve actions performed by one or more entities on one or more documents. For example, after the sending entity 110 sends a request associated with a set of documents to the acting entity 120, the event detection module 220 determines that the acting entity 120 performed actions to complete tasks in the request (e.g., review documents, sign documents, make payment). The event detection module 220 retrieves the recipient notification definition from the notification definition database 215 corresponding to the request and determines whether the acting entity's 120 actions satisfy one or more event criteria included in the notification definition. In some embodiments, the activities may involve recipient events that do not involve actions by the acting entity 120. For example, recipient event may include when a subset of documents is sent to the receiving entity 130, when a subset of documents is delivered to the receiving entity 130, when the receiving entity 130 completes one or more tasks, when the receiving entity 130 declines to perform one or more tasks, when the receiving entity 130 fails authentication check, or other events involving the receiving entity 130. When the event detection module 220 detects that one or more events described by the one or more event criteria in the notification definition for the request has occurred, the event detection module 220 sends a signal to the extraction module 225 identifying the one or more event criteria that have been satisfied.

The extraction module 225 receives the signal from the event detection module 220 identifying the one or more event criteria that have been satisfied and extracts data to include in a notification to the receiving entity 130. The extraction module 225 retrieves the notification definition associated with the satisfied event criteria and extracts data associated with the subset of documents to include in the notification having the types of data identified in the notification definition. The data to include in the notification may depend on the types of event criteria that were satisfied. After extracting the types of data to include in the notification, the extraction module 225 may also retrieve notification preferences of the receiving entity 130 stored in the notification definition database 215 to determine whether the extracted types of data meet the notification preferences of the receiving entity 130. Based on the notification preferences, the extraction module 225 may remove certain types of data from being included in the notification. The extraction module 225 provides the extracted data to the notification module 230.

The notification module 230 receives the extracted data from the extraction module 225, generates a notification including the extracted data, and transmits the notification to the receiving entity 130. After receiving the extracted data, the notification module 230 may format the received data according to the data format preferences (e.g., JSON) of the receiving entity 130. Prior to sending the notification, the notification module 230 may determine whether the receiving entity 130 has completed authentication requirements for the subset of documents being sent to the receiving entity 130. This prevents the receiving entity 130 from receiving the documents through the notifications or data included in the documents before completing the authentication requirements that grant the receiving entity 130 access to the documents. In some embodiments, the notification module 230 may determine whether the receiving entity 130 has completed authentication requirements and whether the notification includes documents to decide whether to send the notification. If the receiving entity 130 does not have an authentication requirement or has completed the authentication requirement, the notification module 230 may send the notification. If the receiving entity has not met the authentication requirement but the notification does not include any documents, the notification module 230 may send the notification. However, if the receiving entity has not met the authentication requirement and the notification includes documents, the notification module 230 may not send the notification or may modify the notification to remove the documents before sending the modified notification.

In some embodiments, the document management system 140 may generate recipient notification recommendations to assist the sending entity 110 select components of the recipient notification definition. Components of the recipient notification definition include event criteria that define when to generate notifications for the receiving user 130 and data types to include in the notifications to the receiving entity 130. Depending on the characteristics of the sending entity 110, the acting entity 120, the receiving entity 130, and the documents that are being sent to the receiving entity 130, the sending entity 110 may wish to set different recipient notification definitions for different envelopes. For example, a recipient notification definition selected by an insurance agent for documents related to insurance policy sent to an insurance company would be different from a recipient notification definition selected by a real estate agent sending documents related to a house purchase to an inspector. However, the sending entity 110 may manage many different types of envelopes sent to various receiving entities 130, and it may be time consuming and difficult for the sending entity 110 to customize recipient notification definition for each envelope or each receiving entity 130. Also, the sending entity 110 may accidentally enable the receiving entity 130 to receive notifications for events irrelevant to the receiving entity 130 or include data types that the receiving entity 130 does not have access privilege to. To prevent such accidents from occurring, the document management system 140 may generate recipient notification recommendations using a machine-learned model for a particular envelope associated with a particular sending entity 110, acting entity 120, and receiving entity 130 based on historical recipient notification definitions selected by historical sending entities 110 in similar circumstances.

The training module 235 trains one or more machine-learned models to predict probabilities of a sending entity selecting components of recipient notification definition. The machine-learned model may be implemented using a variety of types of machine-learned models or trainable networks. For example, the machine-learned model may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, or any suitable algorithms. In some embodiments, the machine-learned model is trained using a training dataset including historical recipient notification data stored in the notification definition database 215 and characteristics of historical sending entities 110, historical acting entities 120, historical receiving entities 130, and historical documents associated with the historical recipient notification data. The historical recipient notification data includes historical types of event criteria selected by historical sending entities 110 and the historical types of data selected by the historical sending entities 110 to send to historical receiving entities 130 when the historical types of events criteria are satisfied by actions of historical acting entities 120. The training module 235 trains the machine-learned model with the training dataset to learn patterns in the components of recipient notification definition selected by sending entities 110 given characteristics of the sending entities 110, acting entities 120, receiving entities 130, and/or documents to output a probability of a sending entity 110 selecting each possible component of the recipient notification definition.

In some embodiments, the machine-learned model is trained to output a probability of the sending entity 130 selecting each targeting criteria (e.g., 18% probability of sending entity A selecting "envelope completed" event criteria, 80% probability of sending entity A selecting "envelope completed" event criteria, 74% probability of sending entity A selecting "recipient delivery failed" event criteria). Similarly, the machine-learned model may be trained to output a probability of the sending entity 130 selecting each data type that the sending entity 110 has the option of including in the notifications to the recipient user 130 (e.g., 80% probability of sending entity A selecting "tabs" data type, 12% probability of sending entity A selecting "documents" data type, 4% probability of sending entity A selecting "attachments" data type).

To generate one or more recipient definition recommendations to present to the sending entity 110 for a given subset of documents being sent to the receiving entity 130, the feature generation module 240 generates features for the subset of documents to input into the machine-learned model. The feature generation module 240 encodes data associated with one or more of the sending entity 110, the acting entity 120, and the receiving entity 130 from the entity profile database 205 and data associated with the subset of documents from the document database 210 to extract features for input into a machine-learned model. For example, the feature generation module 240 accesses the entity profile data of the sending entity 110, the acting entity 120, and the receiving entity 130 and document data associated with the subset of documents being sent to the receiving entity 130 and generates a mathematical representation of the data. The mathematical representation may be a multi-entry vector (a "feature vector"), with each entry representative of a feature of the training data. Each entry of the feature vector may be indicative of a particular data type, data magnitude, data value, or combination thereof.

The features may include characteristics of one or more of the sending entity 110, the acting entity 120, and the receiving entity 130. For example, the features include entity characteristics (e.g., type of industry, accounts associated with the entity, entities with which the entity has interacted in the past), previous activity within the document management system 140, previous notifications received from the document management system 140, and other information associated with the entity. The features may include characteristics of one or more documents in the subset. For example, the features include document type of a document, content of a document (e.g., certain keywords within certain portions of the document or within the document as a whole), metadata associated with a document, other information associated with a document.

The definition recommendation module 245 applies the machine-learned model to features extracted by the feature generation module 240 to generate definition recommendations for the sending entity 110. The definition recommendation module 245 provides the features as input to the machine-learned model and generates one or more definition recommendations based on the outputs of the machine-learning model. In some embodiments, the output of the machine-learned model are probabilities of the sending entity 110 selecting various event criteria to trigger notifications and data types to include in the notifications. The definition recommendation module 245 may compare the probabilities to a predetermined threshold and determine whether to recommend the corresponding components to the sending entity 110. When a component is associated with a probability greater than the predetermined threshold, the component may be recommended.

In some embodiments, the definition recommendation module 245 may generate the recommendation responsive to receiving a request from the sending entity 110 for the recommendation. In other embodiments, the definition recommendation module 245 may automatically generate the recommendations responsive to detecting that the sending entity 110 has generated a request to send documents to the acting entity 120 and the receiving entity 130. In some embodiments, the definition recommendation module 245 generates the definition recommendations after receiving recipient notification definition from the sending entity 110 and determines whether one or more components of the recipient notification definition received from the sending entity 110 are different from the one or more components in the recommendation. For example, if the recipient notification definition selected by the sending entity 110 includes a component that is not included in the recommendation, the definition recommendation module 245 may recommend that the sending entity 110 remove the component, and if the recipient notification definition does not include a component that is included in the recommendation, the definition recommendation module 245 may recommend that the sending entity 110 add the missing component.

After generating the definition recommendations for the sending entity 110, the definition recommendations are presented to the sending entity 110 via a graphical user interface. In some embodiments, the definition recommendations may be provided after the sending entity 110 has provided the notification definition. The sending entity 110 may review the definition recommendations and decide whether to accept or reject the definition recommendations. When the sending entity 110 decides to accept the definition recommendations, the recipient notification definition provided by the sending entity 110 may be modified to add or remove event criteria and/or data types. In some embodiments, the definition recommendations may be provided before the sending entity 110 has provided the notification definition.

The user interface module 250 generates a graphical user interface that is presented to the sending entity 110 for receiving requests to send envelopes to the acting entity 120 and the receiving entity 130, receiving recipient notification definition, and presenting recipient notification recommendations. The graphical user interface may include graphical elements that the sending entity 110 can interact with to provide input to the document management system 140. For example, the sending entity 110 can identify which documents to include in an envelope, identify the acting entity 120 and the receiving entity 120, provide recipient notification definitions, or other types of input. An example graphical user interface for setting recipient notification definitions is shown in FIG. 4.

Figure 3:
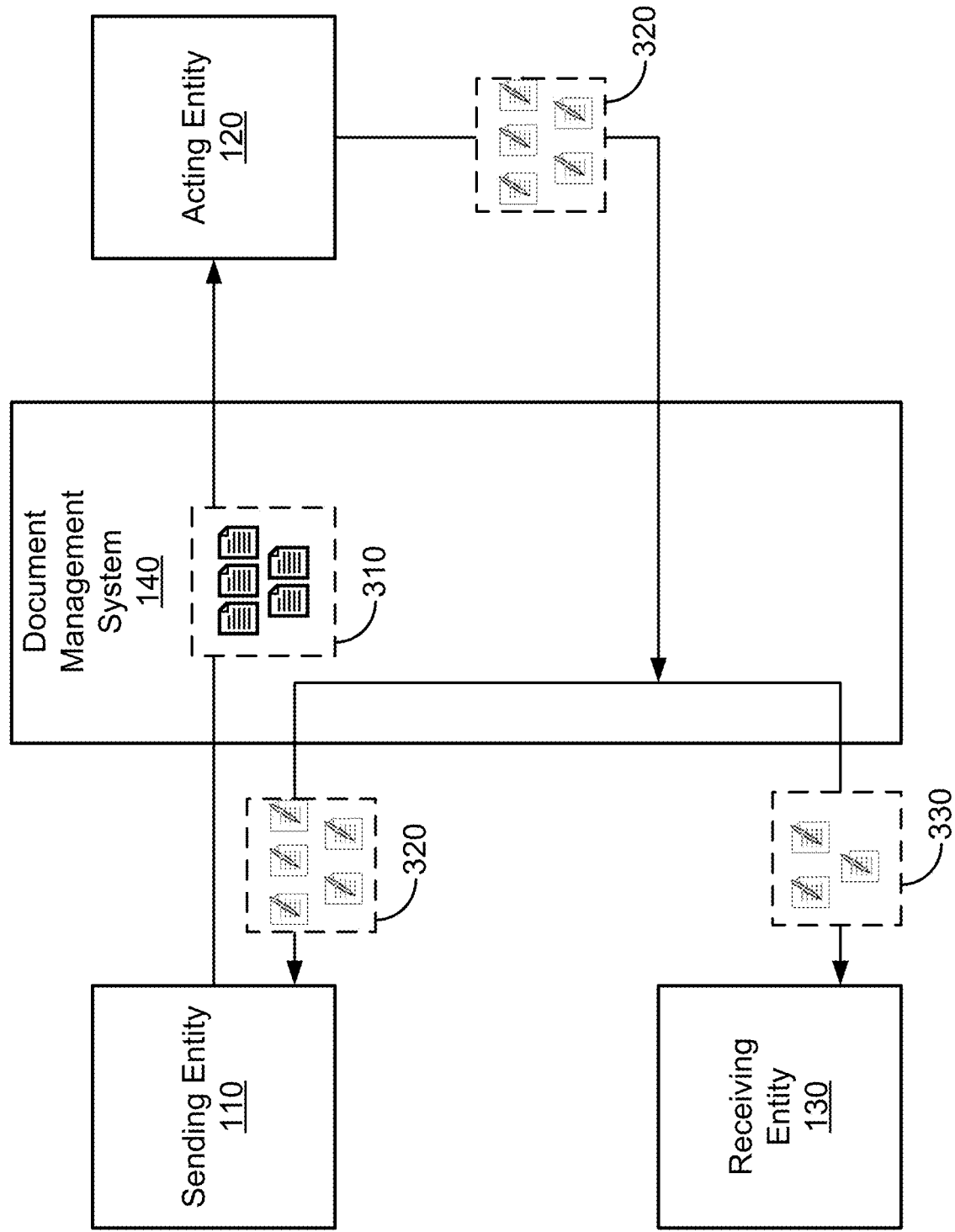
FIG. 3 illustrates a process of sending notifications, in accordance with an embodiment.

FIG. 3 illustrates a process of sending notifications, in accordance with an embodiment. The document management system 140 receives a request from the sending entity 110 to send a set of documents 310 to the acting entity 120 for the acting entity 120 to review and sign. When the document management system 140 receives the request from the sending entity 110 identifying the acting entity 120 and the set of documents 310 (e.g., including 5 documents), the document management system 140 also receives an identification of the receiving entity 130 to receive a subset of documents 330 (e.g., including 3 documents) after the acting entity 120 has signed the set of documents 320. The document management system 140 also receives a recipient notification definition from the sending entity 110 including event criteria indicating when the document management system should generate notifications for the receiving entity 130 and data types to include in the notifications.

In some embodiments, one or more event criteria may be satisfied by actions of the acting entity 120 (e.g., when the acting entity 120 completes signing the subset of documents 330). When the event criteria included in the recipient notification definition are satisfied, the document management system 140 sends the subset of documents 330 to the receiving entity 130 and also generates and transmits notifications including types of data associated with the subset of documents 330 to the receiving entity 130. The receiving entity 130 receives a subset of documents 330 after the acting entity 120 has signed, but the sending entity 110 receives the complete set of the signed documents 320 because the sending entity 110 is the owner of the set of documents 310. The sending entity 110 may receive notifications from the document management system 140 including data types associated with the complete set of documents 310. That is, notifications sent to the sending entity 110 can include data that is not included in notifications sent to the receiving entity 130 because the sending entity 110 has access to additional documents.

FIG. 4 illustrates an example graphical user interface (GUI) 400 of a document management system for providing notification definition, in accordance with an embodiment. The GUI 400 may be generated by the user interface module 250 of the document management system 140 and presented to the sending entity 110 responsive to the sending entity 110 generating a request to send a subset of documents to a receiving entity. The GUI 400 includes graphical elements that the sending entity 110 can interact with to select trigger events 410 to indicate when to generate recipient notifications for the receiving entity 130 and data types 420 that can be included in the recipient notifications.

Examples of trigger events 410 include envelope events such as an envelope being signed or completed and/or recipient events such as an envelope being sent to the receiving entity 130, an envelope failing to be delivered to the receiving entity 130, an envelope successfully being delivered to the receiving entity 130, an envelope being signed or completed by the receiving entity 130, an envelope being signed or completed by the receiving entity 130, an envelope being declined by the receiving entity 130, and the receiving entity 130 failing authentication for an envelope. Examples of data types 420 include documents in the envelope sent by the sending entity 110, attachments provided by the acting entity 120, folders owned by the sending entity 110, identities of one or more acting entities 120 and receiving entities 130 associated with the envelope, input from the acting entity 120 for tabs (e.g., input fields) in the envelope, and status of a payment.

Figure 5:
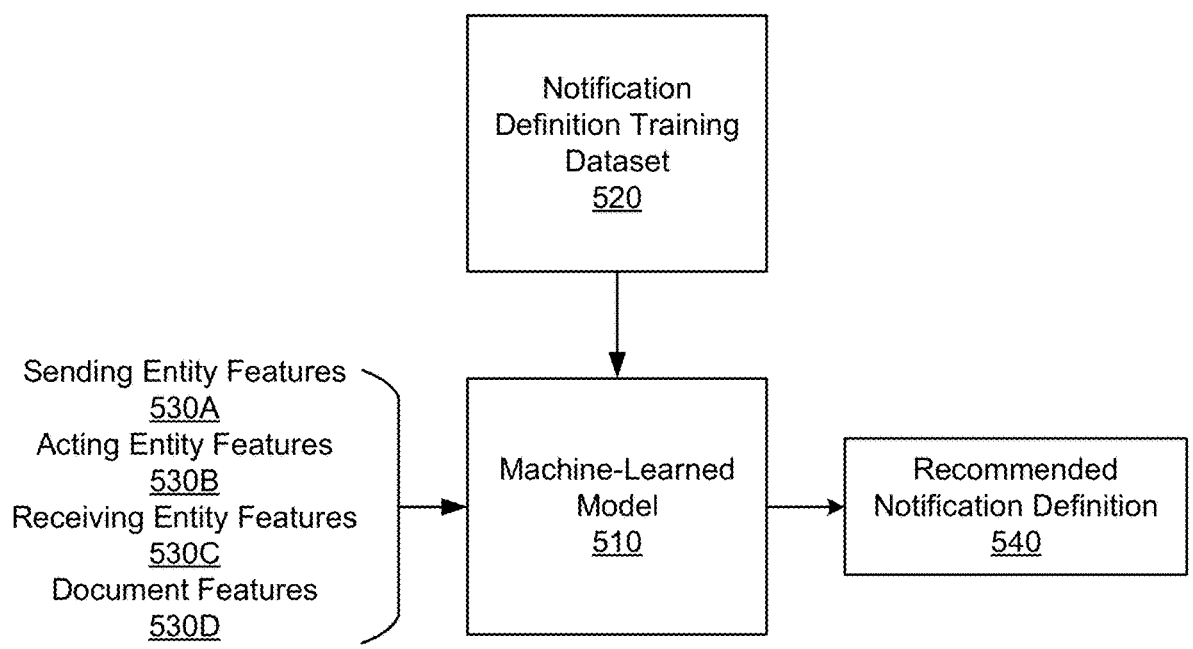
FIG. 5 illustrates a process of training and applying a machine-learned model for providing notification recommendations, in accordance with an embodiment.

FIG. 5 illustrates a process of training and applying a machine-learned model 510 for providing notification recommendations, in accordance with an embodiment. The machine-learned model 510 is trained and used by the document management system 140. As described above with respect to FIG. 2, during a training phase, the training module 235 may use notification definition training dataset 520 including historical notification definitions selected by historical sending entities to train the machine-learned model 510. During a deployment phase, the definition recommendation module 245 may generate one or more definition recommendations for the sending entity 130 that is selecting components of the recipient notification definition for sending notifications to the receiving entity 130. The definition recommendation module 245 receives one or more features of sending entity features 530A, acting entity features 530B, receiving entity features 530C, and document features 530D generated by the feature generation module 240 and applies the received features 530 to the trained machine-learned model 510 that outputs recommended notification definition 540.

In some embodiments, the training module 235 uses actions of the sending entity 130 after being provided with the recommended notification definition 540 as feedback to re-train the machine-learned model 510. For example, an association between one or more features of sending entity features 530A, acting entity features 530B, receiving entity features 530C, and document features 530D and one or more components in the recommended notification definition 540 may be strengthened responsive to the sending entity 110 accepting the recommendation. Similarly, an association between one or more features of sending entity features 530A, acting entity features 530B, receiving entity features 530C, and document features 530D and one or more components in the recommended notification definition 540 may be weakened responsive to the sending entity 110 not accepting the recommendation.

Process of Managing Notifications

FIG. 6 is a flowchart illustrating a process 600 for providing a notification, in accordance with an embodiment. In process 600, a document management system accesses 610 a set of documents associated with a sending entity and an acting entity. The sending entity generates a request to send the set of documents to the acting entity using the document management system. The document management system receives 620 a recipient notification definition from the sending entity with the set of documents associated with the sending entity and the acting entity. The recipient notification definition includes an identification of a receiving entity to receive a subset of the set of documents, an identification of one or more event criteria associated with the subset of documents, and an identification of types of data associated with the subset of documents to provide to the receiving entity. The document management system provides 630 the set of documents to the acting entity. The set of documents may be associated with one or more tasks that the acting entity is required to complete. The document management system monitors actions of the acting entity within the document management system and detects 640 one or more actions performed on the set of documents by the acting entity. In response to determining that the detected one or more actions performed by the acting entity satisfy the one or more event criteria in the recipient notification definition, the document management system generates and sends 650 a notification including the types of data identified in the recipient notification definition.

Process of Providing Recipient Notification Recommendations

Figure 7:
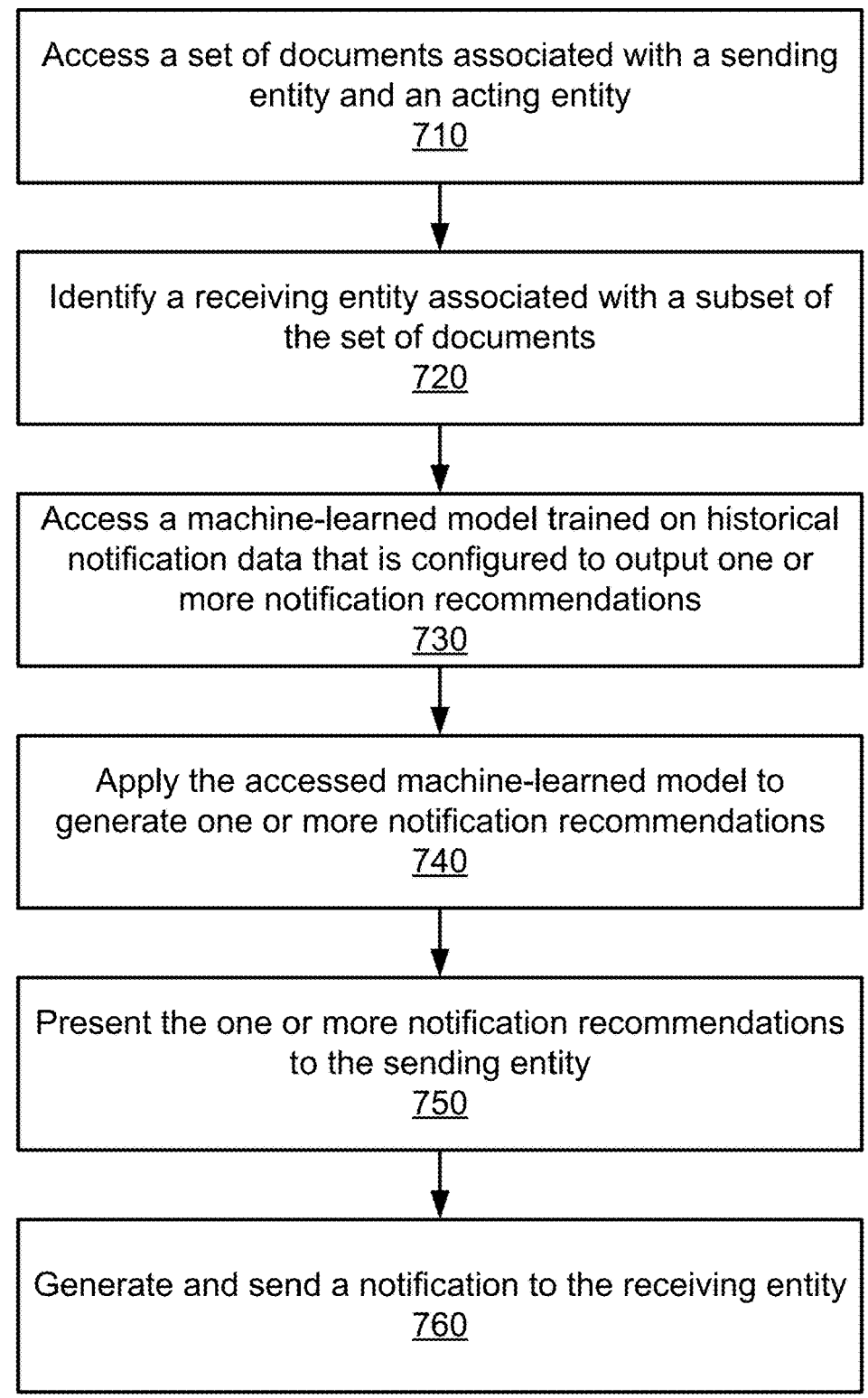
FIG. 7 is a flowchart illustrating a process for providing notification recommendations, in accordance with an embodiment.

FIG. 7 is a flowchart illustrating a process 700 for providing notification recommendations, in accordance with an embodiment. In process 700, a document management system accesses 710, a set of documents associated with a sending entity and an acting entity. The sending entity instructs the document management system to send the set of documents to the acting entity. The document management system identifies 720 a receiving entity associated with a subset of the set of documents. The receiving entity is selected by the sending entity to receive the subset of the set of documents. After determining the sending entity, the acting entity, and the receiving entity, the document management system accesses 730 a machine-learned model trained on historical recipient notification data that is configured to output one or more notification recommendations based on characteristics of one or more of sending entities, acting entities, receiving entities, and documents. The historical notification data includes historical types of event criteria set by historical sending entities that caused historical types of data selected by the historical sending entities to be sent to historical receiving entities when the historical types of event criteria were satisfied by historical acting entities performing actions on historical documents. The document management system applies 740 the accessed machine-learned model to characteristics of one or more of the sending entity, the acting entity, the receiving entity, and the subset of documents to generate one or more recipient notification recommendations. The one or more recipient notification recommendations can include recommendations to add or remove event criteria to trigger a notification and/or types of data to include in a notification. The document management system presents 750 the one or more recipient notification recommendations to the sending entity. In response to the sending entity selecting one or more recipient notification recommendations, the document management system generates and sends 760 a notification to the receiving entity in response to event criteria of the selected one or more recipient notification recommendations being satisfied by the acting entity.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   accessing, by a document management system, a set of documents, the set of documents associated with a sending entity and an acting entity;
   identifying, by the document management system, a receiving entity associated with a subset of documents from the set of documents;
   training, by the document management system, a machine learning model using historical recipient notification data comprising: historical types of event criteria set by historical sending entities and historical content information to be sent to historical receiving entities when the historical types of event criteria are satisfied by historical acting entities, the historical content information indicating data type of attachments and attributes included in notifications sent to the historical receiving entities when the historical types of event criteria are satisfied by the historical acting entities performing actions on historical documents;
   determining, by the machine learning model of the document management system, based on characteristics of one or more of the sending entity, the acting entity, the receiving entity, and the subset of documents, one or more event criteria for a notification and content information, the content information indicating data types of one or more attachments and attributes to include in the notification when the one or more event criteria are satisfied;
   generating, by the machine learning model, a recipient notification definition for the notification, the recipient notification definition including indications of the receiving entity, the one or more event criteria, and the content information;
   presenting, by the document management system, the recipient notification definition to the sending entity; and
   in response to a selection of the recipient notification definition, sending, by the document management system, the notification to the receiving entity in response to the one or more event criteria indicated in the recipient notification definition being satisfied.

2. The method of claim 1, wherein identifying the receiving entity associated with the subset of documents to send to the receiving entity comprises identifying the receiving entity and the subset of documents from the set of documents based on an input from the sending entity.

3. The method of claim 1, wherein the historical recipient notification data further comprises characteristics of one or more of; the historical sending entities, the historical acting entities, the historical receiving entities, and the historical documents.

4. The method of claim 1, wherein generating the recipient notification definition further comprises generating, by the machine learning model and based on the characteristics of the one or more of the sending entity, the acting entity, the receiving entity, and the subset of documents, a plurality of recipient notification recommendations, wherein a recipient notification recommendation of the plurality of recipient notification recommendations corresponds to the recipient notification definition, wherein presenting the notification definition comprises presenting the plurality of recipient notification recommendations via a user interface associated with the sending entity, and wherein the selection of the recipient notification definition comprises a selection, via the user interface, of the recipient notification recommendation from the plurality of recipient notification recommendations.

5. The method of claim 4, wherein the plurality of recipient notification recommendations indicate respective content information.

6. The method of claim 1, wherein the recipient notification definition is an automated recipient notification definition, and wherein the method further comprises:

receiving, by the document management system, a manual recipient notification definition from the sending entity, the manual recipient notification definition including an identification of the receiving entity to receive the subset of documents, an identification of one or more event criteria associated with the subset of documents, and an identification of manual content information; and in response to the selection of the automated recipient notification definition, modifying, by the document management system, the manual recipient notification definition based on the selection of the automated recipient notification definition.

7. The method of claim 6, wherein the manual recipient notification definition is modified by adding or removing one or more event criteria to trigger notifications.

8. The method of claim 6, wherein the manual recipient notification definition is modified by adding or removing data from the manual content information to include in notifications.

9. The method of claim 1, wherein the machine learning model is trained to output, for each of a plurality of event criteria and a plurality of content information, a probability of the sending entity selecting a respective event criterion from the plurality of event criteria or respective content information from the plurality of content information.

10. The method of claim 9, wherein each of one or more probabilities associated with the one or more event criteria or the content information included in the recipient notification definition is greater than a predetermined threshold.

11. Computer-readable storage media containing computer program code that, when executed by a processor, causes the processor to:

access, by a document management system, a set of documents, the set of documents associated with a sending entity and an acting entity;

identify, by the document management system, a receiving entity associated with a subset of documents from the set of documents;

train, by the document management system, a machine learning model using historical recipient notification data comprising: historical types of event criteria set by historical sending entities and historical content information to be sent to historical receiving entities when the historical types of event criteria are satisfied by historical acting entities, the historical content information indicating data type of attachments and attributes included in notifications sent to the historical receiving entities when the historical types of event criteria are satisfied by the historical acting entities performing actions on historical documents;

determine, by the machine learning model of the document management system, based on characteristics of one or more of the sending entity, the acting entity, the receiving entity, and the subset of documents, one or more event criteria for a notification and content information, the content information indicating data types of one or more attachments and attributes to include in the notification when the one or more event criteria are satisfied;

generate, by the machine learning model, a recipient notification definition for the notification, the recipient notification definition including indications of the receiving entity, the one or more event criteria, and the content information;

present, by the document management system, the recipient notification definition to the sending entity; and in response to a selection of the recipient notification definition, send, by the document management system, the notification to the receiving entity in response to the one or more event criteria indicated in the recipient notification definition being satisfied.

12. The computer-readable storage media of claim 11, wherein to identify the receiving entity associated with the subset of documents to send to the receiving entity, the computer program code causes the processor to identify the receiving entity and the subset of documents from the set of documents based on an input from the sending entity.

13. The computer-readable storage media of claim 11, wherein the historical recipient notification data further comprises characteristics of one or more of: the historical sending entities, the historical acting entities, the historical receiving entities, and the historical documents.

14. The computer-readable storage media of claim 11, wherein to generate the recipient notification definition, the computer program code further causes the processor to generate, by the machine learning model and based on the characteristics of the one or more of the sending entity, the acting entity, the receiving entity, and the subset of documents, a plurality of recipient notification recommendations, wherein a recipient notification recommendation of the plurality of recipient notification recommendations corresponds to the recipient notification definition, wherein to present the notification definition, the computer program code further causes the processor to present the plurality of recipient notification recommendations via a user interface associated with the sending entity, and wherein the selection of the recipient notification definition comprises a selection, via the user interface, of the recipient notification recommendation from the plurality of recipient notification recommendations.

15. The computer-readable storage media of claim 14, wherein the plurality of recipient notification recommendations indicate respective content information.

16. The computer-readable storage media of claim 11, wherein the recipient notification definition is an automated recipient notification definition, and wherein the computer program code further causes the processor to:

receive a manual recipient notification definition from the sending entity, the manual recipient notification definition including an identification of the receiving entity to receive the subset of documents, an identification of one or more event criteria associated with the subset of documents, and an identification of manual content information; and in response to the selection of the automated recipient notification definition, modifying the manual recipient notification definition based on the selection of the automated recipient notification definition.

17. The computer-readable storage media of claim 16, wherein the manual recipient notification definition is modified by adding or removing one or more event criteria to trigger notifications.

18. The computer-readable storage media of claim 16, wherein the manual recipient notification definition is modified by adding or removing data from the manual content information to include in notifications.

19. The computer-readable storage media of claim 11, wherein the machine learning model is trained to output, for each of a plurality of event criteria and a plurality of content information, a probability of the sending entity selecting a respective event criterion from the plurality of event criteria or respective content information from the plurality of content information.

20. A system comprising:
- a processor; and
- non-transitory computer-readable storage media containing computer program code that, when executed by a processor, causes the processor to:
  - access a set of documents, the set of documents associated with a sending entity and an acting entity;
  - identify a receiving entity associated with a subset of documents from the set of documents;
  - train a machine learning model using historical recipient notification data comprising; historical types of event criteria set by historical sending entities and historical content information to be sent to historical receiving entities when the historical types of event criteria are satisfied by historical acting entities, the historical content information indicating data type of attachments and attributes included in notifications sent to the historical receiving entities when the historical types of event criteria are satisfied by the historical acting entities performing actions on historical documents;
  - determine, by the machine learning model, based on characteristics of one or more of the sending entity, the acting entity, the receiving entity, and the subset of documents, one or more event criteria for a notification and content information, the content information indicating data types of one or more attachments and attributes to include in the notification when the one or more event criteria are satisfied;
  - generate, by the machine learning model, a recipient notification definition for the notification, the recipient notification definition including indications of the receiving entity, the one or more event criteria, and the content information;
  - present the recipient notification definition to the sending entity; and
  - in response to a selection of the recipient notification definition, send the notification to the receiving entity in response to the one or more event criteria indicated in the recipient notification definition being satisfied.

* * * * *